United States Patent [19]

Yamamoto et al.

[11] Patent Number: 4,547,040
[45] Date of Patent: Oct. 15, 1985

[54] OPTICAL FIBER ASSEMBLY AND PROCESS FOR PREPARING SAME

[75] Inventors: Takashi Yamamoto, Hiroshima; Kenichi Sakunaga, Otake, both of Japan

[73] Assignee: Mitsubishi Rayon Co., Ltd., Tokyo, Japan

[21] Appl. No.: 506,411

[22] Filed: Jun. 21, 1983

[51] Int. Cl.$^4$ .................. D02G 3/00; B29D 11/00
[52] U.S. Cl. .................. 350/96.34; 350/96.30
[58] Field of Search .......... 350/96.30, 96.31, 96.34; 264/2.7

[56] References Cited

U.S. PATENT DOCUMENTS

| 3,993,834 | 11/1976 | Chimura et al. | 350/96.34 X |
| 3,999,834 | 12/1976 | Ohtomo et al. | 350/96.34 |
| 4,138,194 | 2/1979 | Beasley et al. | 350/96.30 |
| 4,161,500 | 7/1979 | Schlenitz et al. | 264/2.7 |
| 4,381,269 | 4/1983 | Kaino et al. | 350/96.30 X |

FOREIGN PATENT DOCUMENTS

| 0008321 | 2/1981 | Japan | 350/96.34 |
| 1037498 | 7/1966 | United Kingdom | 350/96.34 |

Primary Examiner—William L. Sikes
Assistant Examiner—Akm E. Ullah
Attorney, Agent, or Firm—Oblon, Fisher, Spivak, McClelland & Maier

[57] ABSTRACT

An optical fiber assembly comprising at least two plastic optical fibers and an embedding material, said plastic optical fibers being arranged substantially in parallel to each other and embedded in said embedding material, wherein each plastic optical fiber comprises a core of polymer having a refractive index, $n_1$, and a cladding of a polymer having a refractive index, $n_2$, wherein the refractive indices $n_1$ and $n_2$ satisfy the following relationship [I]

$$n_1 - n_2 > 0.01 \qquad [I]$$

The optical fiber assembly is prepared by extruding from a spinneret a plurality of optical fibers having a core-cladding structure and an embedding material of a polymer in three layers of core, cladding and embedding material, according to a melt-spinning method; arranging the optical fibers in parallel to each other before solidification thereof; and bonding the optical fibers together through the embedding material.

21 Claims, 11 Drawing Figures (a)

(b)

(c)

(a)

(b)

OPTICAL FIBER ASSEMBLY AND PROCESS FOR PREPARING SAME

BACKGROUND OF THE INVENTION

(1) Field of the Invention

This invention relates to an optical fiber assembly comprising at least two plastic optical fibers, each plastic optical fiber comprising (1) a core of a polymer having a refractive index $n_1$ and (2) a cladding of a polymer having a refractive index $n_2$, said plastic optical fibers being arranged substantially in parallel to each other and embedded in (3) in embedding material of a polymer having a refractive index $n_3$, and also to a process for the preparation of this optical fiber assembly.

(2) Description of the Prior Art

Optical fiber assemblies, such as those composed of at least two optical fibers arranged substantially in parallel to each other and bonded to each other, are increasingly used as light transmitting members for optical communication, high speed data transmission, various process controls, office automation, computers and the like.

One form of an optical fiber assembly, which is formed of a great number of optical fibers gathered and bonded to each other, is disclosed in Japanese Patent Publication No. 27279/64. According to the process disclosed in this patent publication, a rod of a polymer having a high refractive index is melt-drawn to form a core, and the surface of the core is covered with a polymer having a low refractive index to form a core-cladding step index type optical fiber. A number of so-prepared optical fibers are wound on a drum in parallel to one another, and they are bonded together so that the claddings are closely contacted with each other to form an optical fiber bundle. The optical fiber bundle is cut and opened to form an optical fiber sheet. Since the thickness of the cladding of the optical fiber used in this process is very small, i.e., less than about 50 μm, core-to-core bonding is undesirably formed when these optical fibers are bonded together, with the result that the light transmission characteristics of the optical fiber sheet are reduced. If this optical fiber sheet is bent or an external force is applied for processing or handling, the bonded portions of the optical fibers are broken and deformation is caused in the claddings of the optical fibers. A drastic reduction of the light transmission characteristics also results.

As an optical fiber assembly in which the above-mentioned disadvantage is eliminated, Japanese Patent Publication No. 23165/78 proposes an optical fiber assembly formed of core-cladding optical fibers having a non-circular (for example, rectangular or hexagonal) core section. When a bending force or external force is applied to this optical fiber assembly on handling thereof, breakage of the bonded portions of the optical fibers is not caused. However, since the core of each optical fiber has a non-circular section, the light transmission characteristics of this optical fiber assembly are inferior. Therefore, a need continues to exist for an optical fiber assembly wherein breakage of the bonded portions of the optical fibers does not occur when a bending force or external force is applied thereto, and which also possesses excellent light transmission characteristics.

SUMMARY OF THE INVENTION

It is therefore a primary object of the present invention to provide an optical fiber assembly which is free from the above-mentioned disadvantages, namely, which has good light transmission characteristics and wherein breakage of the bonded portions of the fibers is not caused when a bending force or external force is applied.

In one aspect of the present invention, there is provided an optical fiber assembly comprising at least two plastic optical fibers and an embedding material, said plastic optical fibers being arranged substantially in parallel to each other and embedded in said embedding material, each plastic optical fiber comprising a core of polymer having a refractive index $n_1$ and a cladding of a polymer having a refractive index $n_2$ wherein the refractive indexes $n_1$ and $n_2$ satisfy the following formula [I]:

$$n_1 - n_2 \geq 0.01 \qquad [I].$$

In another aspect of the present invention, there is provided a process for the preparation of optical fiber assemblies, which comprises extruding from a spinneret assembly a plurality of optical fibers comprising a core of a polymer having a refractive index $n_1$, a cladding of a polymer having a refractive index $n_2$ and an embedding portion of a polymer having a refractive index $n_3$ according to a melt-spinning method in three layers, wherein the refractive indexes $n_1$ and $n_2$ satisfy the following formula [I]:

$$n_1 - n_2 \geq 0.01 \qquad [I].$$

arranging the optical fibers in parallel to each other before solidification thereof, and then bonding together the optical fibers through the embedding portions by fusion.

DESCRIPTION OF THE PREFERRED EMBODIMENTS

As described hereinbefore, a prior art optical fiber assembly as disclosed in Japanese Patent Publication No. 27279/64 has the cross-section shown FIG. 1(a). When this optical fiber assembly is bent or an external force is applied for processing or handling, the bonded portions 3 of the optical fibers shown in FIG. 1(a) tend to be broken whereby cracks 4 are formed in cladding 2 as shown in FIG. 1(b). Another prior art optical fiber assembly as disclosed in Japanese Patent Publication No. 23165/78 has the cross-section shown in FIG. 2(a) or 2(b). Each optical fiber core 1 has a non-circular cross-section such as a rectangular or hexagonal section, and hence, the light transmission characteristics of the optical fiber assembly are not satisfactory.

Figure 3:
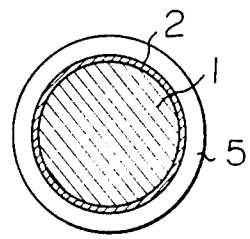
FIG. 3 shows the cross-section of an optical fiber used in the present invention.

In contrast, the optical fiber assembly of the present invention has a cross-section shown in FIGS. 4(a), 4(b), 4(c) or 4(d). This optical fiber assembly is formed advantageously by using optical fibers having a sectional structure shown in FIG. 3, that is, step index type plastic optical fibers comprising a core 1 of a polymer having a refractice index $n_1$ and a cladding 2 of a polymer having a refractive index $n_2$, which are embedded in an embedding material 5 of a polymer having a refractive index $n_3$. When an optical fiber assembly is formed from the optical fiber having a sectional structure as shown in FIG. 3, that is, a multilayer core-clad structure comprising a core, a cladding and an embedding portion, the thickness of the embedding portion can freely be controlled without affecting the light transmission characteristics. When at least two optical fibers of this type having a multilayer core-cladding structure, especially a three-layer structure, are bonded together, formation of an optical fiber assembly becomes possible by bonding the embedding portions. This process is quite different from the conventional process in which claddings of optical fibers are bonded together in the preparation of the optical fiber assembly. As pointed out hereinbefore, in the optical fiber assembly formed according to the conventional process, the light transmission characteristics are reduced by breakage of the bonded claddings. This problem is substantially solved in the optical fiber assembly of the present invention because bonding is effected not through the claddings but through the embedding portions.

According to the present invention, at least two step index type plastic optical fibers comprising a core 1 of a polymer having a refractive index $n_1$ and a cladding 2 of a polymer having a refractive index $n_2$ are embedded substantially in parallel to each other in an embedding material of a polymer having a refractive index $n_3$, wherein the refractive indexes $n_1$ and $n_2$ satisfy the following formula [I]:

$$n_1 - n_2 \geqq 0.01 \quad [I]$$

In the case of optical fibers not satisfying the formula [I], reflection of the light incident into the core on the interface between the core and cladding is insufficient and the light transmission characteristics are poor. Thus, an optical fiber assembly having good optical transmission characteristics cannot be obtained from such optical fibers. The larger the value of $(n_1 - n_2)$, the more improved are the light transmission characteristics in the optical fibers. Ordinarily, however, this value is adjusted within the range of from 0.01 to 0.20.

In order to obtain optical fibers in which generation of noises is minimized, it is preferred that the polymers for the cladding and embedding material be selected so that the following formula [II]:

$$n_3 - n_2 > 0 \quad [II]$$

is satisfied.

Polymers having excellent optical transparency are used in the present invention. For example, there may be used polystyrene (n=1.59), polymethyl methacrylate (n=1.49), a styrene/methyl methacrylate copolymer (n=1.50-1.58), poly-4-methylpentene-1 (n=1.46), a polycarbonate (n=1.50-1.59), a methyl methacrylate/styrene/maleic anhydride copolymer (n=1.50-1.58), a methyl methacrylate/styrene/α-methylstyrene/maleic anhydride copolymer (n=1.50-1.58), a methyl methacrylate/vinyltoluene/- maleic anhydride copolymer (n=1.50-1.58), fluorine-containing polymers having a value n of 1.38 to 1.48, such as a polyfluoroalkyl methacrylate polymer and a vinylidene fluoride/tetrafluoroethylene copolymer, and deuteration products of the foregoing polymers, especially deuterated polystyrene (n=1.59) and deuterated polymethyl methacrylate (n=1.49), wherein n indicates the refractive index of each polymer.

In the multilayer core-cladding optical fiber used for the preparation of the optical fiber assembly of the present invention, the adhesiveness and adhesion should be good in the interface between the cladding and core and in the interface between the cladding and embedding portion. Using optical fibers which are insufficient in these properties, peeling or breakage of the cladding is readily caused, and, the optical fiber assembly of the present invention having excellent characteristics cannot be obtained. In view of the foregoing, it is preferred that a copolymer comprising (A) 30 to 99.95% by weight of a polyfluoroalkyl ester of acrylic acid or methacrylic acid, (B) 0.05 to 10% by weight of a vinyl monomer containing at least one hydrophilic group (hereinafter referred to as "hydrophilic monomer") and (C) 0 to 69.95% by weight of another copolymerizable vinyl monomer or monomers be used as the polymer for formation of the cladding. If the copolymerization ratio of the monomer (A) is lower than 30% by weight, the refractive index of the copolymer is too high and a cladding suitable for the production of an optical fiber having good light transmission characteristics cannot be formed. If the copolymerization ratio of the monomer (A) exceeds 99.95% by weight, the adhesion of the cladding to the core or embedding material becomes insufficient.

Various polyfluoroalkyl esters of acrylic acid and methacrylic acid may be used, and products obtained by the ester-forming reaction between acrylic acid or methacrylic acid and trifluoroethanol, tetrafluoropropanol or pentafluoropropanol are preferred.

A fluorine-containing copolymer in which the copolymerization ratio of the hydrophilic monomer is lower than 0.05% by weight is insufficient in adhesion and resistance to heat decomposition. In contrast, a copolymer in which the copolymerization ratio of the above-mentioned monomer exceeds 10% by weight does not satisfy the requirements of the transparency and refractive index for the cladding material.

Suitable carboxyl group-containing monomer as the hydrophilic monomer, include ethylenically unsaturated mono- and di-carboxylic acid monomers, ethylenically unsaturated epoxy monomers, ethylenically unsaturated carboxylic acid amides, N-alkylcarboxylic acid amides, N-methylolcaboxylic acid amides, N-alkyl ethers of these acid amides, and ethylenically unsaturated polycarboxylic acid monomers.

Suitable ethylenically unsaturated mono- or dicarboxylic acid monomer, include, for example, acrylic acid, methacrylic acid, crotonic acid, maleic acid, fumaric acid, itaconic acid, glutaconic acid, 3-methylglutaconic acid, muconic acid, dihydromuconic acid, methylene-malonic acid, citraconic acid, mesaconic acid, methylene-glutaric acid and monomers represented by the following formula:

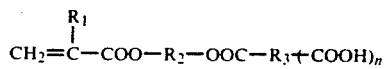

wherein $R_1$ stands for —H or —$CH_3$, $R_2$ stands for an alkylene group having 2 to 4 carbon atoms, $R_3$ stands for an alkylene group having 2 to 3 carbon atoms, —CH=CH— or a phenylene group, and n is an integer of 1 or 2.

From the viewpoint of improving the adhesiveness or thermal stability, acrylic acid and methacrylic acid are especially preferred as the hydrophilic monomer.

Suitable glycidyl group-containing monomer as another type of hydrophilic monomer, include glycidyl methacrylate, glycidyl acrylate, β-methylglycidyl methacrylate, β-methylglycidyl acrylate and allyl glycidyl ether. Of these, glycidyl methacrylate and methylglycidyl methacrylate are preferred.

Suitable carboxylic acid amine group-containing monomer, include the ethylenically unsaturated carboxylic acid amides, N-alkylcarboxylic acid amides, N-methylolcarboxylic acid amides and alkyl ethers thereof.

Suitable amide group-containing monomer, include acrylamide, methacrylamide, N-methylacrylamide, N-methylmethacrylamide, N,N-diethylacrylamide, N,N-diethylmethacrylamide, maleic acid amide, fumaric acid amide, itaconic acid amide, monoamides, diamides and ester amides of other ethylenically unsaturated dicarboxylic acids, N-methylolacrylamide, N-methylolmethacrylamide, and derivatives thereof.

Suitable hydroxyl group-containing monomer, include hydroxyethyl acrylate, hydroxyethyl methacrylate, hydroxypropyl acrylate, hydroxypropyl methacrylate, hydroxybutyl acrylate, hydroxybutyl methacrylate, hydroxyhexyl acrylate and hydroxyhexyl methacrylate.

Suitable vinyl monomer (C), include, for example, methyl methacrylate, ethyl methacrylate, n-propyl methacrylate, n-butyl methacrylate, nonyl methacrylate, lauryl methacrylate, methyl acrylate, n-butyl acrylate, 2-ethylhexyl acrylate, styrene, α-methylstyrene and maleic anhydride, or a mixture thereof. In view of the copolymerization characteristics, esters of methacrylic acid are preferred.

If it is only intended to reduce the refractive index of the cladding material, it is preferred that the vinyl monomer (C) not be present in the polymer constituting the cladding material. However, since the vinyl monomer (C) acts as a refractive index-adjusting agent, it is preferred that the vinyl monomer (C) is copolymerized in an amount of from 0 to 69.95% by weight in the polymer constituting the cladding material. If the copolymerization ratio of the vinyl monomer (C) exceeds 69.95% by weight, the refractive index of the resulting polymer becomes too high and the polymer is not suitable for use as the cladding material. Furthermore, this vinyl monomer (C) is effective for adjusting the glass transition temperature of the polymer to be used as the cladding material. For example, if a vinyl monomer which homopolymerizes to a material having a high glass transition temperature is copolymerized, the resulting copolymer will also have a high glass transition temperature. If a vinyl monomer which yields a homopolymer having a low glass transition temperature is copolymerized, the resulting copolymer will also have a low glass transition temperature. Accordingly, the vinyl monomer (C) is appropriately selected according to the intended use of the optical fiber assembly.

An ordinary radical polymerization initiator may be used as the polymerization catalyst for formation of the polymer used as the cladding material in the present invention. For example, organic peroxides such as di-tert-butyl peroxide, dicumyl peroxide, methyl ethyl ketone peroxide, tert-butyl perphthalate, tert-butyl perbenzoate, methyl isobutyl ketone peroxide, lauroyl peroxide, cyclohexyl peroxide, 2,5-dimethyl-2,5-di-tert-butyl-peroxyhexane, tert-butyl peroctanoate, tert-butyl perisobutyrate and tert-butyl-peroxyisopropyl carbonate, and azo compounds such as methyl 2,2'-azobisisobutyrate, 1,1'-azobiscyclohexane carbonitrile, 2-phenylazo-2,4-dimethyl-4-methoxyvaleronitrile, 2-carbamoyl-azobisisobutyronitrile, 2,2'-azobis(2,4-dimethylvaleronitrile) and 2,2'-azobisisobutyronitrile can be used.

Alkylmercaptan which are customarily used as a modifier of the polymerization degree, may be used as a chain transfer agent at the step of forming the cladding polymer.

Any conventional polymerization means may be used in this process including suspension polymerization, bulk polymerization and solution polymerization. In order to obtain a polymer having a high purity, a bulk polymerization process is preferred.

The multilayer core-cladding optical fibers used in the present invention should have such properties that when an optical fiber assembly is formed by bonding at least two optical fibers, reduction of the light transmission characteristics due to breakage of the cladding and deformation of the interface between the core and cladding is not caused. Since the multilayer core-clad optical fibers used in the present invention have an embedding portion around the cladding, the optical fibers of the present invention are more advantageous as compared with the conventional step index type optical fibers having a two-layer structure in that occurrence of the above-mentioned troubles is substantially prevented when an optical fiber assembly is prepared. In order to further obviate the occurrence of the above difficulties, it is preferred that the thickness of the cladding of the optical fiber having a multilayer core-cladding structure, which is used in the present invention, be 1 to 30 μm, especially 2 to 20 μm. If the thickness of the cladding is smaller than 1 μm, the light reflecting property in the core-cladding interface is reduced. If the thickness of the cladding is larger than 30 μm, peeling or cracking is readily caused in the core-cladding interface.

Figure 5:
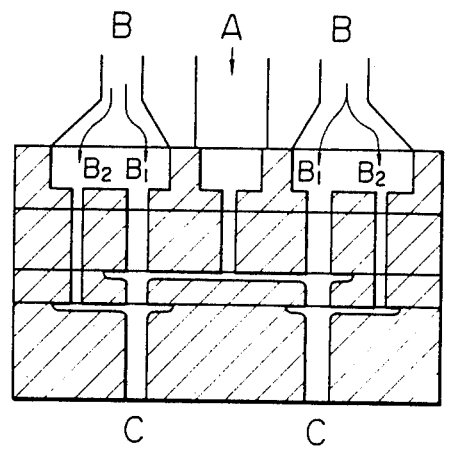
FIGS. 5(a) and 5(b) show the cross-sections of the spinneret assemblies used for the preparation of the optical fiber assemblies of the present invention.
Figure 5:
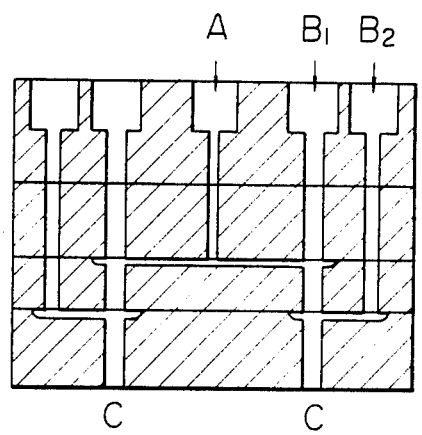

The thickness of the cladding can be controlled by controlling the supply of the polymer to a zone A of a spinneret apparatus shown in FIG. 5. According to one preferred method of this invention, optical fibers extruded from the spinneret are drawn at a temperature of 120° to 180° C. and a draw ratio of 1.1 to 5.0.

The optical fiber assembly of the present invention may be prepared according to various methods as described below.

According to the first method, at least two core-cladding optical fibers are formed from two polymers satisfying the requirement of the formula [I] and extruded together in an embedding portion composed of a melt of a polymer having refractive index $n_3$ to form a sheet or rod in which the optical fibers are arranged substantially in parallel to each other, and then, the sheet or rod is cooled to be solidified. According to the second method, polymers having refractive indexes $n_1$, $n_2$ and $n_3$ satisfying the requirements of the formulae [I] and [II] are extruded from a spinneret in the form of optical fibers having an embedding polymer surrounding the optical fibers with at least two of the individual optical fibers arranged substantially in parallel to each other before they are cooled to be solidified, whereby they are bonded to each other through the embedding portions by fusion, and then, the optical fibers surrounded by the embedding are cooled to be solidified. According to the third method, multilayer core-cladding optical fibers and an embedding polymer, formed in the same manner as in the second method, are cooled and thereby solidified and a plurality of these optical fibers surrounded by embedding are arranged substantially in parallel and bonded together through the embedding portions by heating them. Among these methods, the third method is most preferred.

This last and preferred method will now be described in detail. At first, optical fibers are melt-shaped by using a spinning nozzle assembly shown in FIG. 5-(a) or 5-(b). A polymer having a refractive index $n_1$ is supplied to a zone $B_1$ of the spinning nozzle, and then, a polymer having a refractive index $n_2$ is supplied to a zone A to form a core-cladding structure. Then, a polymer having a refractive index $n_3$ is supplied to a zone $B_2$ to form an embedding material. The polymers are thus extruded from the orifices to prepare a number of optical fibers having a multilayer core-cladding structure. The optical fibers are arranged in parallel to one another, and the embedding portions of the fibers are bonded together before cooling and solidification thereof. Solidification under cooling is then effected to form an optical fiber assembly of the present invention. According to this method, the core-cladding interface is prevented from falling in direct contact with the opening face of the nozzle when the optical fibers are prepared. Since the conventional step index type optical fibers have a core-cladding two-layer structure, the core-cladding interface is brought very close to the opening face of the nozzle, and therefore, disturbance is caused because of the Barus effect at the time of extrusion. Furthermore, even if the nozzle is formed at a very precision, fine scratches or stains are present on the opening face of the nozzle and hence, disturbance is caused on the opening face of the nozzle. Therefore, according to the conventional techniques, optical fibers excellent in the light transmission characteristics cannot be obtained. In contrast, according to the above-mentioned method of the present invention, access of the core-cladding interface to the opening face of the nozzle is moderated and the extruded fibers do not undergo bad influences of the Barus effect. Morever, even if scratches or stains are present on the opening face of the nozzle, a smooth interface can be formed by dint of viscosity characteristics of the molten polymers. Accordingly, optical fibers having very excellent light transmission characteristics can be obtained.

In the optical fiber assembly of the present invention, at least two optical fibers, scores of thousands of optical fibers in some case, are arranged substantially in parallel to one another and they are bonded together through the embedding portions. This optical fiber assembly is preferably prepared by using a spinning device comprising orifices arranged at intervals of 0.05 to 5 mm. If the orifice distance is too small, undesirable adhesion of fibers by fusion is caused on the lower face of the nozzle device and formation of optical fibers having good light transmitting characteristics becomes difficult. If the orifice distance is too large, troubles are readily caused at the subsequent step of bonding the optical fibers through the embedding portions.

Bonding of optical fibers through the embedding portions should be carried out so that the claddings of the optical fibers are not damaged and that a substantially parallel arrangement is maintained. In order to form an optical fiber assembly having good properties while satisfying these requirements, it is preferred that the thickness of the embedding portion of each optical fiber be 0.5 to 100 μm, more preferably 1 to 50 μm. If the thickness of the embedding portion is smaller than 0.5 μm, an optical fiber assembly having a high fiber accumulation density can easily be obtained, but the claddings are readily damaged when the optical fibers are bonded together. If the thickness of the embedding portion exceeds 100 μm, bonding of optical fibers through the embedding portions can be facilitated and the claddings are hardly damaged at the time of bonding, but an optical fiber assembly having a high fiber accumulation density can hardly be obtained. The thickness of the embedding portion can be adjusted, for example, by controlling the amount of the polymer to be supplied to the zone $B_1$ of the apparatus shown in FIG. 5, and by drawing the extrudate at a temperature of 120° to 180° C. and a draw ratio of 1.1 to 5.0.

An assembly of substantially parallel optical fibers, the production of which is very difficult according to the conventional methods, can easily be prepared according to the present invention. In the present invention, if a plurality of sheet-like assemblies of substantially parallel optical fibers are piled and laminated, an optical fiber assembly having a larger capacity can easily be obtained.

Figure 1:
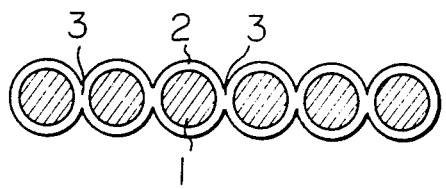
FIGS. 1(a) and 1(b) show the cross-sections of a conventional optical fiber assembly.
Figure 1:
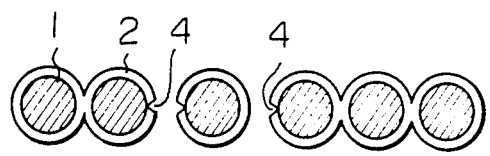

In the conventional step index type optical fiber assembly, with an increase of the number of the optical fibers to be arranged in parallel to one another, the flexibility is reduced and the handling property is degraded. In contrast, in the optical fiber assembly of multilayer core-cladding optical fibers according to the present invention, the intended flexibility can easily be maintained. More specifically, after both the end face portions of the optical fiber assembly are secured, the intermediate part between both the end face portions which is required to be flexible is crumpled to release the bonding in the embedding portions, whereby the intended flexibility can be maintained. In the case of a fiber assembly formed by bonding the conventional step index type optical fibers, if the bonding is released in an intermediate part between both the end face portions, as shown in FIG. 1-(b), the claddings of the optical fibers are damaged and reduction of the light transmission characteristics cannot be avoided. The optical fiber assembly of the present invention, which is formed by bonding multilayer core-cladding optical fibers, avoids the above-mentioned disadvantage.

The present invention will now be described in detail with reference to the following examples that by no means limit the scope of the invention. In the examples, parts are by weight.

EXAMPLE 1

A mixture comprising 100 parts of methyl methacrylate, 0.40 part of t-butylmercaptan and 0.0017 part of di-tert-butyl peroxide was heated at a temperature of 155° C. for an average residence time of 4.0 hours, according to the continuous bulk polymerization process, in a reaction vessel having a spiral ribbon type stirrer. The reaction mixture thus obtained was fed to a devolatizer as shown in British Pat. No. 1,423,288 provided with a twin-screw vent. Then, the volatile components were separated through the vent. The vent portion was kept at a temperature of 240° C. and under a pressure of 4 mmHg, while an extruding portion was kept at a temperature of 230° C. The polymer melt thus formed was discharged through a gear pump maintained at 230° C. and supplied as core polymer and embedding material to a core-sheath composite spinning head maintained at 230° C.

Separately, 2,2,2-trifluoroethyl methacrylate prepared from methacryloyl chloride and 2,2,2-trifluoroethanol was polymerized by using azobisisobutyronitrile as a catalyst in the presence of a small amount of n-octylmercaptan to form a sheath polymer having a refractive index of 1.413. The sheath copolymer was passed through a screw melt extruder and supplied via a gear pump to the sheath-core composite spinning head.

The simultaneously supplied core and sheath molten polymers were extruded at 230° C. through a spinneret shown in FIG. 5-(a) (the orifice diameter was 1.0 mm, the number of orifices was 64 and the orifice distance was 1.0 mm). The extrudate was gathered in two layers by guides at a position 15 cm below the spinneret and the two layers were contacted to bond them together by fusion. The two-layer sheet having 64 optical fibers was completely cooled, taken up at a speed of 100 m/min by a nip roller and then wound on a tape winder.

From the results of microscopic observation, it was confirmed that the obtained optical fibers in the sheet had a core diameter of 80 μm, and a sheath thickness of 3 μm, the outer embedding portion had a thickness of 12 μm, and the sheet had a thickness of 0.2 mm with a width of 3.5 mm. The product was a very soft sheet-like light transmitting member having two layers, each having 32 (optical fibers) arranged substantially in parallel.

The two-layer sheet-like light transmitting member was cut into a length of 20 m, and when light was uniformly introduced from one end and light coming from the other end was examined, it was found that there was no substantial unevenness of the light intensity among the 64 optical fibers.

The sheet-like light transmitting member was set at an apparatus for measuring the light transmission loss, and an intermediate part of the sheet-like light transmitting member was crumpled over a length of 1 m to separate the 64 optical fibers individually. No change of the quantity of the transmitted light was observed. The transmission loss of the entire sheet was 260 dB/km.

EXAMPLE 2

Figure 4:
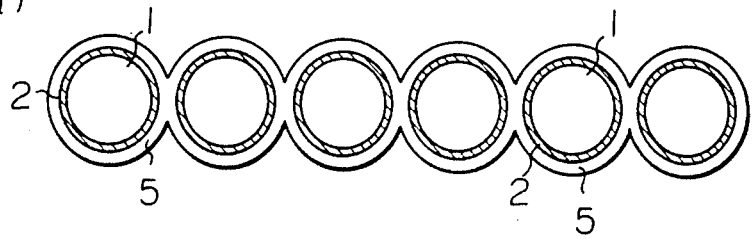
FIGS. 4(a), 4(b), 4(c), and 4(d) show the cross-sections of the optical fiber assemblies of the present invention.
Figure 4:
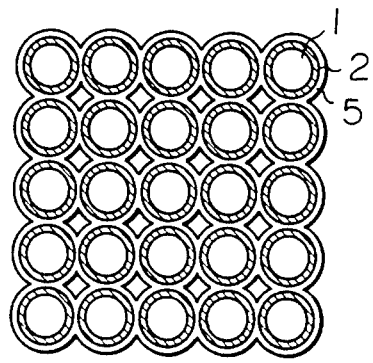
Figure 4:
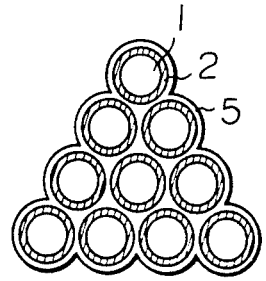
Figure 4:
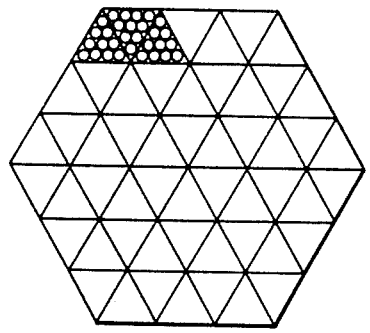

The spinning operation was carried out in the same manner as described in Example 1, and the optical fibers were cooled to be thereby solidified without bonding the embedding portions below the spinneret. The optical fibers were taken up at a speed of 10 m/min by a first nip roller and were then drawn at a draw ratio of 1.5 in a drawing box heated at 145° C. A guide was disposed at the outlet of the drawing box, and 10 optical fiber filaments were gathered and contacted to bond each other through the embedding material. The light transmitting member thus formed was taken up by a second nip roller and wound on a winder. When the section of the obtained light transmitting member was observed by a microscope, it was confirmed that 10 filaments were accumulated in a triangular form as shown in FIG. 4-(c). The distances between every two adjacent filaments was uniform and the filaments were regularly arranged. In the obtained light transmitting member, the core diameter was 200 μm, the cladding thickness was 4 μm and the thickness of the embedding portion was 30 μm. The transmission loss of the 10 filaments as a whole was 270 dB/km. Accordingly, in the obtained light transmitting member, the transmission loss was greatly reduced, and the uniformity was very excellent.

Triangular light transmitting members prepared according to the above-mentioned methods were accumulated and arranged as shown in FIG. 4-(d), and an image guide was constructed by using an epoxy resin adhesive. In this image guide, the image distortion or divergence was very small.

COMPARATIVE EXAMPLE 1

A light transmitting member in which core-cladding two-layers light transmitting fibers were bonded through cladding portions by fusion was prepared in the same manner as described in Example 1 except that an conventional core-sheath orifices were used instead of the orifices used in Example 1.

The light transmitting member was cut into a length of 20 m, and when light was uniformly introduced from one end and light coming from the other end was observed, it was found that the unevenness of the light intensity was very large among 10 light transmitting members, and some light transmitting members hardly transmitted the light. The transmission loss of the 10 light guides as a whole was 3,500 dB/km.

Figure 2:
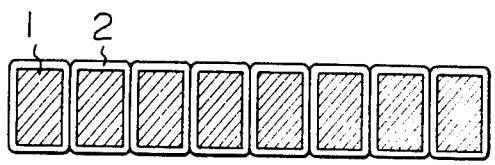
FIGS. 2(a) and 2(b) show the cross-sections of another conventional optical fiber assembly.
Figure 2:
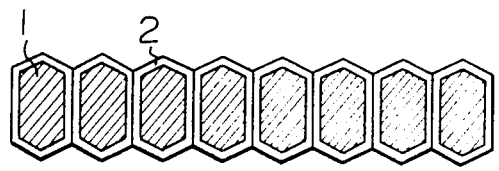

According to the above-mentioned method, a core-cladding optical fiber assembly was prepared by using a rectangular orifice as shown in FIG. 2-(a). The bonding state of the optical fibers was good, but the unevenness of the light transmission was very large and the light transmission loss was as large as 1,700 dB/km.

EXAMPLE 3

An autoclave for bulk polymerization having an inner capacity of 2 liters was charged with 100 parts of a monomer mixture shown in Table 1 for a cladding polymer, 0.5 part of azobisisobutyronitrile and 0.1 part of n-dodecylmercaptan. Polymerization was carried out at 50° C. for 10 hours and at 70° C. for 5 hours to obtain a cladding polymer having properties shown in Table 2.

Separately, a mixture comprising 100 parts of methyl methacrylate, 0.40 part of t-butylmercaptan and 0.0017 part of di-tert-butyl peroxide was heated at a temperature of 155° C. for a residence time of 4 hours according to a continuous bulk polymerization method using a reaction vessel provided with a spiral ribbon type stirrer. The reaction mixture thus obtained was fed to a devolatizer provided with a twin-screw vent as in Example 1. Then, the polymer melt thus formed was supplied as core polymer as well as embedding polymer to an extruder where volatile components were removed through a vent kept at a temperature of 240° C. and under a pressure of 4 mmHg.

The extruding portion was kept at a temperature of 230° C. Then, the polymer thus formed was supplied to a spinning head maintained at 230° C.

Also the cladding polymer was melted and supplied to the spinning head. The spinning operation was carried out in the same manner as described in Example 1 except that a 100-hole spinneret was used. The spun fibers were taken up at a speed of 10 m/min and drawn at a temperature of 140° C. and a draw ratio of 1.8. A guide was disposed at the outlet of the drawing box, and 100 optical fibers were gathered and bonded together through the embedding material to form an optical fiber assembly in which the 100 optical fibers were arranged in a plane. The distances between every two adjacent fibers were uniform. The fibers were regularly arranged and no unevenness of the light transmitting property was observed. The optical fibers had a core diameter of 100 m and properties shown in Table 2.

EXAMPLE 4

An optical fiber assembly was prepared in the same manner as described in Example 3 except that polymethyl methacrylate having a refractive index of 1.49 was used as core polymer and the embedding material and a pentafluoropropyl methacrylate/methyl methacrylate/methacrylic acid copolymer (70/28/2 weight ratio) having a refractive index of 1.422 was used as the cladding polymer. The properties of the optical fiber assembly thus obtained are shown in Table 3.

TABLE 1

| | | Composition (% by weight) of Cladding Polymer | | |
|---|---|---|---|---|
| Run No. | Core | 2,2,3,3-Tetra-fluoropropyl methacrylate | Copolymerized vinyl monomer | Hydrophilic monomer |
| 1 | polymethyl methacrylate | 90 | 8, methyl methacrylate | 2, methacrylic acid |
| 2 | polymethyl methacrylate | 90 | 8, methyl methacrylate | 2, acrylic acid |
| 3 | polymethyl methacrylate | 90 | 8, methyl methacrylate | 2, glycidyl methacrylate |
| 4 | polymethyl methacrylate | 90 | 8, methyl methacrylate | 2, N—octylacrylamide |
| 5 | polymethyl methacrylate | 90 | 8, methyl methacrylate | 2, N—butoxymethylacrylamide |
| 6 | polymethyl methacrylate | 90 | 8, methyl methacrylate | 2, condensate prepared from hydroxyethyl acrylate and phthalic anhydride |
| 7 | polymethyl methacrylate | 70 | 18, methyl methacrylate | 2, methacrylic acid |
| 8 | polymethyl methacrylate | 99.5 | — | 0.5, methacrylic acid |
| 9 | polymethyl methacrylate | 70 | 29, methyl methacrylate | 1, methacrylic acid |
| 10 | polymethyl methacrylate | 90 | — | 10, methacrylic acid |
| 11 | polymethyl methacrylate | 90 | 10, methyl methacrylate | — |
| 12 | polymethyl methacrylate | 99.5 | 0.5 methyl methacrylate | — |

TABLE 2

| | Properties of Cladding | | | Thickness (m) of Embedding Portion | Light Transmission Loss (dB/km) | | | Opening Number | | State of Core-Cladding Interface of | Cracking Resistance of Cladding |
|---|---|---|---|---|---|---|---|---|---|---|---|
| Run No. | Thickness ($\mu$m) | Refractive Index ($n_D^{25}$) | Adhesiveness | | 520 nm | 570 nm | 650 nm | Measured Value | Theoretical Value | | |
| 1 | 2 | 1.427 | o | 8 | 82 | 75 | 125 | 0.408 | 0.436 | Circular and smooth | Excellent |
| 2 | 2 | 1.425 | o | 8 | 87 | 85 | 133 | 0.350 | 0.422 | Circular and smooth | " |
| 3 | 2 | 1.426 | o | 8 | 95 | 88 | 139 | 0.328 | 0.439 | Circular and smooth | " |
| 4 | 2 | 1.427 | o | 8 | 94 | 87 | 139 | 0.322 | 0.436 | Circular and smooth | " |
| 5 | 2 | 1.427 | o | 8 | 98 | 91 | 150 | 0.329 | 0.436 | Circular and smooth | " |
| 6 | 2 | 1.428 | o | 8 | 93 | 87 | 139 | 0.372 | 0.436 | Circular and smooth | " |
| 7 | 2 | 1.433 | o | 8 | 87 | 78 | 138 | 0.383 | 0.432 | Circular and smooth | " |
| 8 | 2 | 1.417 | o | 8 | 89 | 79 | 138 | 0.435 | 0.467 | Circular and smooth | " |
| 9 | 2 | 1.428 | o | 8 | 115 | 99 | 156 | 0.415 | 0.436 | Circular and smooth | " |
| 10 | 2 | 1.430 | o | 8 | 109 | 98 | 154 | 0.370 | 0.426 | Circular and smooth | " |
| 11 | 2 | 1.428 | x | 8 | 201 | 195 | 218 | 0.27 | 0.426 | Circular and smooth | Fairly good |
| 12 | 2 | 1.417 | x | 8 | 192 | 205 | 209 | 0.28 | 0.467 | Circular and smooth | Fairly good |

TABLE 3

| Run No. | Core Diameter (μm) | Cladding Thickness (μm) | Thickness of Embedding portion (μm) | Bending Resistance | Unevenness of Light Transmitting Property | Light Transmission Loss (dB/km) (650 nm) | Width (mm) of Sheet |
| --- | --- | --- | --- | --- | --- | --- | --- |
| 13 | 280 | 4 | 6 | No peeling in interface | Not observed | 182 | 30 |
| 14 | 286 | 8 | 50 | No peeling in interface | " | 183 | 40 |
| 15 | 236 | 16 | 16 | No peeling in interface | " | 182 | 30 |
| 16 | 268 | 16 | 50 | No peeling in interface | " | 184 | 40 |
| 17 | 300 | 50 | 50 | Partial peeling | " | 185 | 50 |
| 18 | 280 | 0.6 | 9.4 | No peeling | Observed | 1500 | 30 |

EXAMPLE 5

An optical fiber assembly was prepared in the same manner as described in Example 1 except that a trifluoroethyl acrylate/methyl methacrylate/methacrylic acid copolymer (65/33/2 weight ratio) having a refractive index 1.440 was used as the cladding polymer instead of the trifluoroethyl methacrylate polymer used in Example 1. Incidentally, the value of ($n_1 - n_2$) was 0.05, the value of ($n_3 - n_2$) was 0.05, and $n_1$ was equal to $n_3$. The properties of the obtained optical fiber assembly are shown in Table 4.

TABLE 4

| Run No. | Core Diameter (μm) | Cladding Thickness (μm) | Thickness (μm) of Embedding Portion | Light Transmission Loss (dB/km) | Bending Resistance |
| --- | --- | --- | --- | --- | --- |
| 19 | 472 | 4 | 10 | 165 | Excellent |
| 20 | 464 | 8 | 10 | 163 | " |
| 21 | 428 | 16 | 20 | 160 | " |

EXAMPLE 6

Three-layer optical fibers were prepared by spinning a polymer shown in Table 5 as the core-forming polymer, the fluorine-containing polymer used in Example 4 as the cladding polymer and polymethyl methacrylate as the embedding polymer. In the obtained optical fiber, the core diameter was 190 μm, the thickness of the cladding was 10 μm and the thickness of the embedding portion was 20 μm. The obtained results are shown in Table 5.

departing from the spirit or scope of the invention as set forth herein.

We claim:

1. An optical fiber assembly comprising at least two plastic optical fibers and an embedding material, said plastic optical fibers being arranged substantially in parallel to each other and embedded in said embedding material, wherein each plastic optical fiber comprises a core of polymer having a refractive index, $n_1$, and a cladding of a polymer having a refractive index, $n_2$, wherein the refractive indices $n_1$ and $n_2$ satisfy the following relationship [I]

$$n_1 - n_2 > 0.01 \quad [I]$$

and wherein said embedding material comprises a polymer having a refractive index $n_3$.

2. The optical fiber assembly according to claim 1, wherein the cladding polymer having a refractive index $n_2$ is a copolymer comprising (A) 30 to 99.95% by weight of a polyfluoroalkyl ester of acrylic acid or methacrylic acid, (B) 0.05 to 10% by weight of a vinyl monomer containing at least one hydrophilic group and (C) 0 to 69.95% by weight of one or more copolymerizable vinyl monomers, thereby attenuating the refractive index $n_2$ of said cladding polymer, wherein said refractive indices $n_2$ and $n_3$ satisfy the following relationship [II]

$$n_3 - n_2 > 0 \quad [II]$$

3. The optical fiber assembly according to claim 1, wherein said core polymer of the plastic optical fibers

TABLE 5

| Run No. | Core-Forming Polymer Kind | $n_1$ Value | $n_1 - n_2$ | $n_3 - n_2$ | $n_1 - n_3$ | Light Transmission Loss (dB/km) | Bending Resistance |
| --- | --- | --- | --- | --- | --- | --- | --- |
| 22 | Polystyrene | 1.59 | 0.16 | 0.06 | 0.10 | 165 (630 nm) | No peeling in core-cladding interface |
| 23 | Polycarbonate | 1.58 | 0.15 | 0.06 | 0.09 | 1200 (770 nm) | No peeling in core-cladding interface |
| 24 | Deuterated polymethyl methacrylate | 1.49 | 0.06 | 0.06 | 0 | 52 (670 nm) | No peeling in core-cladding interface |
| 25 | Deuterated polystyrene | 1.59 | 0.16 | 0.06 | 0.10 | 124 (690 nm) | No peeling in core-cladding interface |

Having now fully described this invention, it will be apparent to one of ordinary skill in the art that many changes and modifications can be made thereto without comprises polystyrene, refractive index of 1.59; polymethyl methacrylate, refractive index of 1.49; styrene/methyl methacrylate copolymer, refractive index of 1.50 to 1.58; poly-4-methyl-1-pentene, refractive index of 1.46; polycarbonate, refractive index of 1.50 to 1.59; methyl methacrylate/styrene/maleic anhydride copolymer, refractive index of 1.50 to 1.58; methyl methacrylate/styrene/α-methylstyrene/maleic anhydride copolymer, refractive index of 1.50 to 1.58; methyl methacrylate/vinyl toluene/maleic anhydride copolymer, refractive index of 1.50 to 1.58; fluorine-containing polymers having a refractive index of 1.38 to 1.48; and the deuteration products of the foregoing polymers.

4. The optical fiber assembly of claim 1, wherein the value $(n_1-n_2)$ is in the range of 0.01 to 0.20.

5. The optical fiber assembly of claim 1, wherein the thickness of said cladding is about 1 to 3 μm.

6. The optical fiber assembly of claim 5, wherein the thickness of said cladding is about 2 to 20 μm.

7. The optical fiber assembly of claim 1, wherein the thickness of said embedding material is about 0.5 to 100 μm.

8. The optical fiber assembly of claim 7, wherein the thickness of said embedding material is about 1 to 50 μm.

9. The optical fiber assembly of claim 2, wherein the polyfluoroalkyl ester of acrylic acid or methacrylic acid comprises the products of the ester-forming reaction of trifluoroethanol, tetrafluoropropanol or pentafluoropropanol and acrylic acid or methacrylic acid.

10. The optical fiber assembly of claim 2, wherein said vinyl monomer comprising at least one hydrophilic group comprises carboxyl group-containing monomers, glycidyl group-containing monomers, carboxylic acid-amine group containing monomers, amide group-containing monomers, and hydroxyl group-containing monomers.

11. The optical fiber assembly of claim 10, wherein said vinyl monomer comprising at least one hydrophilic group comprises acrylic acid and methacrylic acid.

12. The optical fiber assembly of claim 2, wherein said copolymerizable vinyl monomer (C) comprises methyl methacrylate, ethyl methacrylate, n-propyl methacrylate, n-butyl methacrylate, nonyl methacrylate, lauryl methacrylate, methyl acrylate, n-butyl acrylate, 2-ethylhexyl acrylate, styrene, α-methylstyrene and maleic anhydride or mixture thereof.

13. A process for the preparation of optical fiber assemblies which comprises:
(a) extruding from a spinneret assembly a plurality of optical fibers comprising a core of a polymer having a refractive index $n_1$, and a cladding of a polymer having a refractive index $n_2$, and an embedding material of a polymer, according to a melt-spinning method, in three layers of core, cladding and embedding material, wherein the refractive indices $n_1$ and $n_2$ satisfy the following relationship [I]:

$$n_1-n_2>0.01 \quad [I]$$

(b) arranging said optical fibers, embedded in said embedding material, substantially in parallel to each other before solidification thereof, and
(c) bonding said optical fibers together through said embedding material.

14. The process for the preparation of optical fiber assemblies according to claim 13, wherein streams of a melt of said core polymer are first formed in the spinneret assembly, then streams of a melt of said cladding polymer are formed around said core polymer streams, then streams of a melt of said embedding polymer are formed around said cladding polymer streams, and then the formed three-layered composite melt streams are extruded from said spinneret assembly.

15. The process for the preparation of optical fiber assemblies according to claim 13, wherein said cladding polymer comprises a copolymer comprising (A) 30 to 99.95% by weight of a polyfluoroalkyl ester of acrylic acid or methacrylic acid, (B) 0.05 to 10% by weight of a vinyl monomer containing at least one hydrophilic group and (C) 0 to 69.95% of one or more copolymerizable vinyl monomers, thereby attenuating the refractive index $n_2$ of said cladding polymer.

16. The process for the preparation of optical fiber assemblies according to claim 13, wherein the thickness of said cladding is about 1 to 30 μm.

17. The process for the preparation of optical fiber assemblies according to claim 13, wherein the thickness of said embedding material is about 0.5 to 100 μm.

18. The process for the preparation of optical fiber assemblies according to claim 16, wherein the thickness of said cladding is controlled by drawing the multi-layer composite polymers comprising the core-cladding optical fibers and the embedding material, and extruding said multi-layer composite polymers from the spinneret assembly.

19. The process for the preparation of optical fiber assemblies according to claim 18, wherein said multi-layer composite polymers are extruded from the spinneret assembly at a temperature of about 120° to 180° C. and a draw ratio of about 1.1 to 5.0.

20. The process for the preparation of optical fiber assemblies according to claim 17, wherein the thickness of said embedding material is controlled by drawing the multi-layer composite polymers comprising the core-cladding optical fibers and the embedding material, and extruding said multi-layer composite polymers from the spinneret assembly.

21. The process for the preparation of optical fiber assemblies according to claim 20, wherein said multi-layer composite polymers are extruded from the spinneret assembly at a temperature of about 120° to 180° C. and a draw ratio of about 1.1 to 5.0.

* * * * *